United States Patent [19]
Oiri et al.

[11] Patent Number: 5,840,410
[45] Date of Patent: *Nov. 24, 1998

[54] MAGNETIC RECORDING MEDIUM HAVING A MAGNETIC LAYER AND A PARTIALLY-FILLED LIQUID LUBRICANT-CONTAINING COATING THEREUNDER

[75] Inventors: Shigeto Oiri, Sagamihara; Yoji Tsukamoto, Yokohama; Hideaki Yasui, Sagamihara, all of Japan

[73] Assignee: Imation Corp., Oakdale, Minn.

[*] Notice: This patent issued on a continued prosecution application filed under 37 CFR 1.53(d), and is subject to the twenty year patent term provisions of 35 U.S.C. 154(a)(2).

[21] Appl. No.: 597,826

[22] Filed: Feb. 7, 1996

[30] Foreign Application Priority Data

Feb. 23, 1995 [JP] Japan ..................................... 7-34980

[51] Int. Cl.$^6$ ...................................................... G11B 5/71
[52] U.S. Cl. .................. 428/212; 428/336; 428/694 BS; 428/900; 428/694 BN; 360/133
[58] Field of Search ..................................... 428/212, 336, 428/694 BS, 900, 694 BN; 360/133

[56] References Cited

U.S. PATENT DOCUMENTS

| | | | |
|---|---|---|---|
| 4,152,485 | 5/1979 | Mizumura et al. | 428/425 |
| 4,411,957 | 10/1983 | Tokuda et al. | 428/425.9 |
| 4,419,164 | 12/1983 | Martinelli | 156/244.11 |
| 4,587,157 | 5/1986 | Brock et al. | 428/216 |
| 4,664,975 | 5/1987 | Kobayashi | 428/323 |
| 4,666,769 | 5/1987 | Miyata et al. | 428/323 |
| 4,680,742 | 7/1987 | Yamada et al. | 369/13 |
| 4,861,656 | 8/1989 | Uchiyama et al. | 428/333 |
| 4,940,606 | 7/1990 | Hilgers et al. | 427/130 |
| 4,963,433 | 10/1990 | Ogawa et al. | 428/323 |
| 4,966,797 | 10/1990 | Ishihara | 427/64 |
| 4,975,322 | 12/1990 | Hideyama et al. | 428/323 |
| 4,985,295 | 1/1991 | Ishihara | 428/213 |
| 5,061,516 | 10/1991 | Isobe et al. | 427/132 |
| 5,151,330 | 9/1992 | Kumamoto et al. | 428/425.9 |
| 5,153,063 | 10/1992 | Okita et al. | 428/336 |
| 5,178,953 | 1/1993 | Anglin | 428/424.6 |
| 5,256,481 | 10/1993 | Miyake et al. | 428/336 |
| 5,258,223 | 11/1993 | Inaba et al. | 428/323 |
| 5,258,231 | 11/1993 | Okita et al. | 428/425.9 |
| 5,268,206 | 12/1993 | Komatsu et al. | 427/548 |
| 5,354,610 | 10/1994 | Ozawa et al. | 428/323 |
| 5,358,777 | 10/1994 | Kojima et al. | 428/212 |
| 5,384,175 | 1/1995 | Kojima et al. | 428/64 |
| 5,405,679 | 4/1995 | Isobe | 428/212 |
| 5,447,782 | 9/1995 | Inaba et al. | 428/212 |
| 5,612,122 | 3/1997 | Tsukamoto et al. | 428/216 |

FOREIGN PATENT DOCUMENTS

| | | |
|---|---|---|
| 0 488 657 A2 | 6/1992 | European Pat. Off. . |
| 0 609 154 A1 | 8/1994 | European Pat. Off. . |
| 56-74831 | 6/1981 | Japan . |
| 57-135431 | 8/1982 | Japan . |
| 61-175922 | 8/1986 | Japan . |
| 61-177631 | 8/1986 | Japan . |
| 61-214127 | 9/1986 | Japan . |
| 62-137723 | 6/1987 | Japan . |
| 63-293718 | 11/1988 | Japan . |
| 63-317926 | 12/1988 | Japan . |
| 62-159337 | 7/1989 | Japan . |
| 1-213822 | 8/1989 | Japan . |
| 1-300419 | 12/1989 | Japan . |
| 2-260124 | 10/1990 | Japan . |
| 3-142709 | 6/1991 | Japan . |
| 57-92423 | 6/1992 | Japan . |
| 5-182183 | 7/1993 | Japan . |
| 5274645 | 10/1993 | Japan . |
| 6-4854 | 1/1994 | Japan . |
| 6-168439 | 6/1994 | Japan . |
| 8-16978 | 2/1996 | Japan . |
| WO 94/18673 | 8/1994 | WIPO . |

*Primary Examiner*—Stevan A. Resan
*Attorney, Agent, or Firm*—Eric D. Levinson

[57] ABSTRACT

A magnetic recording medium comprising a nonmagnetic substrate, a liquid lubricant-containing coating layer having a porosity (U) formed on the substrate, and a magnetic layer having a porosity (M) formed directly on the coating layer. The ratio of porosity (U/M) between the coating and magnetic layers is between 0.75 and 1.25. The volume percentage of the lubricant contained in the pores of the coating layer based on the whole pore volume in the coating layer is from 35 to 85%. This improves the durability of the magnetic layer.

11 Claims, No Drawings

MAGNETIC RECORDING MEDIUM HAVING A MAGNETIC LAYER AND A PARTIALLY-FILLED LIQUID LUBRICANT-CONTAINING COATING THEREUNDER

FIELD OF THE INVENTION

The present invention relates generally to a magnetic recording medium, and more specifically, to a magnetic recording medium comprising a nonmagnetic substrate, a liquid lubricant-containing coating layer formed on the substrate, and a magnetic layer formed directly on the coating layer.

DESCRIPTION OF THE RELATED ART

There is a seemingly neverending demand for increasing the storage capacity, and thus usually, the storage density, of removable storage media. One approach for accomplishing this is to reduce the thickness of the magnetic recording layer. However, when the thickness of the magnetic layer is reduced to less than 1 μm, some practical problems such as decrease of durability of the magnetic layer arise. This is because, since the thickness of the magnetic layer which directly contacts a magnetic head is decreased, the magnetic layer cannot have a volume of pores sufficient to create a lubricant reservoir capable of improving the durability of the magnetic layer by the improvement of tribologic properties such as the decrease of a coefficient of friction in the case of contact of the magnetic layer to the magnetic head and increase of wear resistance.

One type of magnetic recording media for solving such problems comprises a nonmagnetic support or substrate, a coating layer formed on the substrate, and a magnetic layer formed directly on the coating layer. The coating layer can contain an amount of a lubricant necessary for the magnetic layer. In this medium, the coating layer may be a magnetic layer which comprises a magnetic material and a binder, and which is formed independently from the above magnetic layer, or a nonmagnetic layer comprising a nonmagnetic powder and a binder.

Examples of such magnetic recording media follow.

(1) Japanese Patent Kokai Publication No. 175922/1986 is one of the earliest patent applications which tried to solve the above problems by differentiating a porosity between the coating layer and the magnetic layer formed directly on the coating layer.

This Kokai publication discloses a magnetic recording medium comprising a nonmagnetic support a nonmagnetic undercoat layer as a coating layer formed on the nonmagnetic support, and a magnetic layer formed directly on the undercoat layer, characterized in that a porosity (M) of the magnetic layer is smaller than a porosity (U) of the undercoat layer.

In the working example of this Kokai publication, there is disclosed a magnetic recording medium in which the porosity of the magnetic layer is 20 vol. % and that of the undercoat layer is 45 vol. %.

Magnetic recording media which intend to achieve the same object as Japanese Kokai Publication No. 175922/1986 by making the porosity of the coating layer larger than that of the magnetic layer on the coating layer are disclosed also in Japanese Kokai Publication Nos. 260124/1990 and 182183/1993.

A magnetic recording medium disclosed in Japanese Kokai Publication No. 260124/1990 has a first magnetic layer as a coating layer and a second magnetic layer formed directly on the first magnetic layer and is characterized by a porosity of the first magnetic layer of from 0.25 to 0.55 and a porosity of the second magnetic layer of from 0.10 to less than 0.25.

A magnetic recording medium disclosed in Japanese Patent Kokai Publication No. 182183/1993 is characterized by a porosity of the first magnetic layer of from 30 to 50% and a porosity for the second magnetic layer of from 10 to 30% by weight.

(2) In contrast to the above recording media, Japanese Kokai Publication No. 293718/1988 discloses a magnetic recording medium which achieves the above object by making the porosity of the coating layer smaller than that of the magnetic layer formed on the coating layer. The magnetic recording medium comprises a first magnetic layer as a coating layer and a second magnetic layer formed directly on the first magnetic layer, and is characterized by a ratio of porosity ($M_2$) of the second magnetic layer to a porosity ($M_1$) of the first magnetic layer ($M_2/M_1$) of from 1.1 to 2.

(3) Japanese Kokai Publication No. 168439/1994 discloses a magnetic recording medium which achieves the same object as in the media of (1) by differentiating contents of a fatty acid and a fatty acid ester as a lubricant between the coating layer and the magnetic layer on the coating layer.

The magnetic recording medium disclosed in this Kokai has a nonmagnetic layer as a coating layer and a magnetic layer formed directly on the nonmagnetic layer and is characterized by a porosity of the nonmagnetic layer of at least 15%, a porosity of the magnetic layer of 15% or less, and a content of the aliphatic acid in the magnetic layer larger than that in the nonmagnetic layer, while a content of the fatty acid ester in the non-magnetic layer is larger than that in the magnetic layer.

(4) Japanese Kokai Publication No. 4854/1994 discloses a magnetic recording medium which achieves the same object as those in (1) by separating a coating layer into two sublayers. That is, the disclosed magnetic recording medium has a nonmagnetic layer as a coating layer and a magnetic layer formed on the nonmagnetic layer and is characterized in that the nonmagnetic layer is divided in two sublayers, and the porosity of a lower nonmagnetic sublayer on the nonmagnetic support side is larger than that of the upper nonmagnetic sublayer.

SUMMARY OF THE INVENTION

However, the durability of the magnetic layer which directly contacts the magnetic head may not be sufficiently improved only by controlling the porosities of the magnetic layer and the coating layer in the specific ranges as disclosed in the prior art. In particular, with a high density magnetic recording medium, a magnetic layer of which should have a decreased thickness, for example, 0.5 μm or less, it is very difficult to improve the durability of the magnetic layer even by the above prior art. An object of the present invention is to provide a magnetic recording medium which improves both the durability and carrier-to-noise ratio characteristics of the magnetic layer.

To solve the above problem, the present invention provides a magnetic recording medium comprising a nonmagnetic support, a liquid lubricant-containing coating layer formed on the nonmagnetic support, and a magnetic layer formed directly on the coating layer. The magnetic layer has a porosity (M) and the coating layer has a porosity (U). The ratio of the porosity (M) of the magnetic layer to the porosity (U) of said coating layer is from 0.75 to 1.25, i.e., $0.75 \leq M/U \leq 1.25$. The volume percentage of the liquid lubricant contained in the pores of the coating layer based on the whole pore volume of the coating layer is from 35 to 85%. This improves the durability of the magnetic layer.

DETAILED DESCRIPTION

When the ratio of the porosities (M/U) is less than 0.75, since a sufficient amount of the liquid lubricant is not supplied from the coating layer to the magnetic layer, the durability of the magnetic layer is deteriorated. When the ratio of the porosities (M/U) exceeds 1.25, since an excessive amount of the liquid lubricant is present on the surface of the magnetic layer, a coefficient of friction between the magnetic head and the magnetic layer (namely, a torque when the magnetic head runs over the magnetic layer) is increased, so that the durability of the magnetic layer is deteriorated. In addition, the increase of the coefficient of friction leads to failure of the magnetic head, namely unstable recording and reproducing. From this view point, the ratio of porosities (M/U) is preferably from 0.9 to 1.2.

When the percentage of the volume of the liquid lubricant contained in the pores of the coating layer based on the whole pore volume in the coating layer is less than 35%, since a sufficient amount of the liquid lubricant is not supplied from the coating layer to the magnetic layer, the durability of the magnetic layer is deteriorated. When this percentage exceeds 85%, since an excessive amount of the liquid lubricant is present on the surface of the magnetic layer, the durability of the magnetic layer is deteriorated and further running failure of the magnetic head is caused as described above. From this view point, this percentage is preferably from 50 to 80%.

The control of the amount of liquid lubricant present in the magnetic layer and on the magnetic layer surface tends to be particularly difficult when the magnetic recording medium is in the form of a floppy disc, as will be explained below.

The floppy disc is assembled by loading a magnetic recording medium which has been punched in a disk shape in a container made of a hard or soft plastic (called a "shell" or "jacket") and used. On inner surfaces of the container, respective cleaning members (called "liners") are provided to contact the magnetic layer surface and clean it. The cleaning member is made of nonwoven fabric to wipe out particles or dust which may cause errors without damaging the magnetic layer surface. However, the nonwoven fabric wipes out the liquid lubricant together with the particles or dusts, and the liquid lubricant, once absorbed in the nonwoven fabric, cannot be used to lubricate the magnetic layer surface.

Accordingly, since the excessive amount of liquid lubricant present on the magnetic layer surface is absorbed by the nonwoven fabric and the amount of liquid lubricant to be maintained by the coating layer and the magnetic layer is decreased, the durability of the magnetic layer is deteriorated. The present invention makes it possible to suitably control the amount of liquid lubricant present in the magnetic layer and on the magnetic layer surface and, in turn, to improve the durability of the floppy disc.

Now, the components of the magnetic recording medium of the present invention will be further explained.

Coating layer

The coating layer of the present invention may be (i) a magnetic layer comprising a magnetic material and a binder, or (ii) a nonmagnetic layer comprising a nonmagnetic powder and a binder.

For the magnetic material, any of the conventional magnetic materials such as a metal magnetic material comprising pure iron, iron oxide magnetic materials, for example, cobalt-containing gamma-iron oxide, barium ferrite and iron carbide may be used. As the nonmagnetic powder, any of the conventional nonmagnetic powders such as aluminum oxide, chromium oxide, titanium monoxide, titanium dioxide, tin oxide, alpha-iron oxide, graphite, silicon carbide, calcium carbonate, barium sulfate, silicon dioxide, or their mixtures may be used. Among them, titanium dioxide, tin oxide, and alpha iron oxide are particularly preferred.

Since such nonmagnetic powder is easily dispersed in the binder (as will be explained below), control of the porosity of the coating layer can be easily achieved. Since such inorganic powder is available in a relatively minute size and in a needle shape, and because the use of such minute needle shape inorganic powder makes it easy to smooth the surface of the coating layer, the surface of the magnetic layer which is formed on the coating layer is smoothed and the magnetic recording characteristics are improved.

An average particle size of such nonmagnetic powder is preferably from 0.01 to 0.5 $\mu$m, more preferably from 0.05 to 0.3 $\mu$m. When the nonmagnetic powder particle has the needle shape, its acicular ratio is preferably in the range between 3 and 20, more preferably in the range between 5 and 10.

In a preferred embodiment, a mixture of an inorganic powder and carbon black is used as the nonmagnetic powder. Since the addition of carbon black prevents static electrification on the surface of the magnetic layer formed on the coating layer and therefore the adhesion of foreign particles such as dust caused by the static electricity, the generation of errors and damage of the magnetic layer surface due to the prevention of contact between the magnetic head and the magnetic layer surface are prevented.

A weight ratio of the nonmagnetic powder to the binder is preferably from 85:15 to 65:35. When this weight ratio is outside this range, control of the porosity of the coating layer is difficult and, as a result, the control of the ratio of porosities (M/U) tends to become difficult. From this viewpoint, a preferred range of this weight ratio is from 80:20 to 70:30.

As the binder, any of the binder resins used in the magnetic recording medium such as polyurethane, polyvinyl chloride, polyvinylidene chloride, epoxy resin, phenol resin, acrylic resin, cellulose resin and polyester may be used. The binder may contain a hardener such as an isocyanate to improve the elasticity or solvent resistance of the coating layer. In this case, the weight ratio of the nonmagnetic powder to the binder is calculated using a total weight of the binder and the hardener as a weight of the "binder."

The coating layer is formed by coating a paint, which is prepared by adding various additives such as a solvent, an abrasive, an antistatic agent, a fungicide, an antioxidant and so on as desired to the above materials, on the nonmagnetic support with a conventional coating means.

The paint of the coating layer may be prepared using a known kneading apparatus or dispersion apparatus, such as a kneader, a planetary mixer, an extruder, a homogenizer, a sand mill, a ball mill, or an attritor. The paint of the coating layer may be coated on the support using a conventional coating means, such as an air doctor coater, a blade coater, an air knife coater, a squeeze coater, a reverse roll coater, a gravure coater, a kiss coater, a spray coater, or a die coater.

The coating layer is preferably formed as a single layer for the simplification of the production step, while it may be formed as a multilayer comprising the above magnetic layer (i) and/or the above nonmagnetic layer (ii).

A thickness of the coating layer is usually 5 µm or less. To readily supply the liquid lubricant (the details of which will be explained below) from the coating layer to the surface of the magnetic layer formed thereon, the thickness of the coating layer is preferably 3 µm or less, more preferably from 1 to 2.5 µm.

To include the liquid lubricant in the coating layer, the liquid lubricant is either directly added to the coating layer mixture and then the mixture is coated, or the coating layer is formed and then a liquid containing the lubricant is applied thereon.

The porosity of the coating layer can be easily controlled by selecting the conditions such as (a) calendering conditions (the porosity being larger as a pressure or a temperature being lower), (b) the size and shape of the nonmagnetic powder particles (the porosity being larger for larger particles, or the porosity being made larger by the needle-shaped particles than the spherical particles), (c) the content of the binder in relation to the nonmagnetic powder (a smaller amount of the binder making the porosity larger), (d) kneading conditions in the preparation of the mixture (a larger solid content in the kneading step or a larger ratio of the powder to the resin making the porosity larger), and (e) a drying rate (quicker drying making the porosity larger).

Magnetic layer

The magnetic layer in the present invention can be formed by the same manner as the above-described coating layer comprising the magnetic material. It is formed directly on the coating layer. This means that no other layer such as an adhesive layer comprising a resin is present between the coating layer and the magnetic layer, whereby the liquid lubricant is well supplied from the coating layer to the magnetic layer and then the durability of the magnetic layer is improved.

The thickness of the magnetic layer is usually 3 µm or less. To improve the electromagnetic conversion characteristics as the high density magnetic recording medium, the thickness is preferably less than 1 µm, more preferably 0.5 µm or less. The magnetic layer may be formed as a multi-layer in accordance with requirements arising from a magnetic recording system in which the magnetic recording medium is used. The porosity of the magnetic layer can be controlled in the same manner as in the case of the coating layer.

Nonmagnetic support

For the nonmagnetic support, any of conventionally used nonmagnetic supports such as flexible supports, for example, a paper sheet, a plastic film, etc., and nonflexible supports, for example, a nonmagnetic metal, a ceramic, etc., may be used. When the magnetic recording medium of the present invention is used as a floppy disc, the flexible support is used. For the plastic film, a single layer film or a multilayer film of plastics such as polyethylene terephthalate, polyethylene naphthalate, polybutyrene terephthalate, polyamide, polyimide, polyphenylene sulfide, polyether ketone, polyether ester, polyether sulfone, polyether imide, polysulfone, polyarylate, and the like may be used.

Liquid lubricant

As used herein, the term "liquid lubricant" means a lubricant which is in the liquid state at a normal temperature (about 25° C.). For the liquid lubricant, fatty acid esters, unsaturated fatty acids, fatty acids having a side chain, silicone oils, paraffins, and the like are preferably used. They may be used independently or as a mixture. The liquid lubricant may contain a fatty acid which is in the solid state at the normal temperature (about 25° C.) such as stearic acid, palmitic acid or myristic acid. The fatty acid may be used by dissolving or dispersing it in the liquid lubricant.

When the coating layer is the nonmagnetic layer comprising the nonmagnetic powder and the binder, the liquid lubricant is preferably present in an amount from 5 to 15 parts by weight, and more preferably from 8 to 11 parts by weight, per 100 parts by weight of the nonmagnetic powder. When the coating layer is the magnetic layer, the amount of the liquid lubricant is preferably from 3 to 10 parts by weight per 100 parts by weight of the magnetic material in the coating layer.

The present invention will be explained further in detail by the following non-limiting Examples and Comparative Examples.

In the following Examples and Comparative Examples, the pore volume and the porosity were measured as follows:

Before the formation of the magnetic layer or after the removal of the magnetic layer, a maximum volume of the liquid lubricant, which can be absorbed by the layer which does not contain any lubricant, per unit volume of the coating layer is measured and used as a "pore volume." With the coating layer or the magnetic layer, the "pore volume" is measured in the same manner as above. Then, the pore volume is divided by an apparent volume of the layer (which is calculated from an apparent thickness and a surface area of the sample) and used as a "porosity."

The details of the materials used in the Examples and Comparative Examples are as follows:

Alpha iron oxide: DNS-235 (manufactured by Toda Industries Ltd. An average particle size (longer axis)= 0.25 µm. An acicular ratio=7.7)

Polyurethane resin: TM-4 (manufactured by Toyobo Co., Ltd. A polyester polyurethane resin having a sodium sulfonate salt group in a molecule)

Vinyl chloride resin: MR-113 (manufactured by Nippon Zeon Co., Ltd. A vinyl chloride resin having a sodium sulfonate salt group, an epoxy group and a hydroxyl group in a molecule)

Carbon black: Ketjen Black EC 600 DJ (supplied by Lion Co., Ltd. Oil absorption=495 ml/100 g)

Oleic acid: Lunac-OA (manufactured by Kao Co., Ltd.)

Isocetyl stearate: ICS-R (manufactured by Kokyu Alkol Co., Ltd.)

Isocyanate (hardener): SBU-0856 (manufactured by Sumitomo Bayer Urethane Co., Ltd.)

Metal magnetic material: HM-55 (manufactured by Dowa Mining Co., Ltd. A metal magnetic material comprising pure iron and having a BET of 45 $m^2/g$)

Alumina (abrasive): HIT-50 (manufactured by Sumitomo Chemical Co., Ltd. BET=8.4 $m^2/g$)

EXAMPLES 1–4

The materials used in the coating layer for Examples 1–4 as shown below:

| Undercoat (coating) layer composition (wt. parts) | Ex. 1 | Ex. 2 | Ex. 3 | Ex. 4 |
|---|---|---|---|---|
| Alpha-iron oxide | 100 | 100 | 100 | 100 |
| Polyurethane resin | 14 | 12 | 14 | 14 |
| Vinyl chloride resin | 14 | 12 | 14 | 14 |
| Carbon black | 5 | 5 | 5 | 5 |
| Oleic acid | 1 | 1 | 1 | 1 |
| Isocetyl stearate | 8 | 9 | 7 | 11 |

-continued

| Undercoat (coating) layer composition (wt. parts) | Ex. 1 | Ex. 2 | Ex. 3 | Ex. 4 |
|---|---|---|---|---|
| Isocyanate | 10 | 9 | 10 | 10 |
| Methyl ethyl ketone | 213 | 205 | 211 | 217 |
| Cyclohexanone | 71 | 69 | 70 | 72 |
| Toluene | 71 | 69 | 70 | 72 |

The composition of the magnetic layer for Examples 1–4 was:

| Magnetic layer composition | Parts by weight |
|---|---|
| Metal magnetic material | 100 |
| Alumina | 8 |
| Polyurethane resin | 10 |
| Vinyl chloride resin | 10 |
| Oleic acid | 2 |
| Isocetyl stearate | 2 |
| Isocyanate | 7 |
| Methyl ethyl ketone | 194 |
| Cyclohexanone | 65 |
| Toluene | 65 |

Each of the above compositions was dispersed in a sand mill using zirconia beads as milling media to prepare an undercoat paint and a magnetic paint. On each of the surfaces of a plastic film having a thickness of 62 μm (polyethylene terephthalate, Product No. C-196, manufactured by Teijin Co., Ltd.), the undercoat paint was coated by gravure coating and crosslinked. Then, the magnetic coating mixture was coated on the respective undercoat layer by the same coating method, calendered, and crosslinked. The thickness of each undercoat layer was 2.0 μm, and that of each magnetic layer was 0.5 μm.

The Table shows a ratio of the porosity of the magnetic layer to that of the coating layer M/U), the percentage of the volume of liquid lubricant (isocetyl stearate) contained in the pores of the coating layer based on a whole pore volume in the coating layer (X %), and the running durability and electromagnetic conversion characteristics of the magnetic recording medium which were measured as follows:

TABLE

| Example No. | M/U | X % | Running durability (passes) | Electromagnetic conversion (C/N) (dB) |
|---|---|---|---|---|
| Ex. 1 | 1.1 | 60 | $30 \times 10^6$ | +1.5 |
| Ex. 2 | 0.9 | 60 | $25 \times 10^6$ | +1.5 |
| Ex. 3 | 1.1 | 50 | $28 \times 10^6$ | +1.5 |
| Ex. 4 | 1.1 | 80 | $30 \times 10^6$ | +1.5 |
| C. Ex. 1 | 1.3 | 60 | $5 \times 10^6$ | +0 |
| C. Ex. 2 | 0.7 | 60 | $6 \times 10^6$ | +1.5 |
| C. Ex. 3 | 1.1 | 30 | $10 \times 10^6$ | +1.5 |
| C. Ex. 4 | 1.1 | 90 | $3 \times 10^6$ | Could not be measured due to running failure |

The magnetic recording medium which had been produced as above was punched in the form of a 3.5 inch (89 mm) disc and contained in a conventionally used shell (a hard plastic container for a floppy disc). With this floppy disc, the running durability and electromagnetic conversion characteristics were measured.

On inner surfaces of the shell, respective liners made of nonwoven fabric (the above cleaning members) were provided so that the liners contacted the respective surfaces of the magnetic disc. The nonwoven fabric consisted of a textile blend of 70 parts by weight of rayon fibers and 30 parts by weight of polyester fibers.

The running durability was evaluated by continuously running the floppy disc while contacting the magnetic heads to both magnetic surfaces of the floppy disc using a 10 MB FD Drive FD-1331 manufactured by NEC), and counting the number of passes until scratches visible to the naked eye were found on either one of the magnetic surfaces.

Regarding the electromagnetic conversion characteristics of the floppy disc, a C/N (a ratio of a carrier signal (C) of 600 kHz to a noise (N) near the carrier signal) was measured. The measured values were expressed as relative values with the C/N of the floppy disc produced in Comparative Example being 0 dB. The larger plus value of the C/N means the better electromagnetic conversion characteristics.

COMPARATIVE EXAMPLES 1–4

Comparative Examples 1–4 were prepared in the same manner as Examples 1–4, except that the following undercoat compositions were used:

| Undercoat layer composition (wt. parts) | Comparative Example No. | | | |
|---|---|---|---|---|
| | 1 | 2 | 3 | 4 |
| Alpha-iron oxide | 100 | 100 | 100 | 100 |
| Polyurethane resin | 17 | 9 | 14 | 14 |
| Vinyl chloride resin | 17 | 9 | 14 | 14 |
| Carbon black | 5 | 5 | 5 | 5 |
| Oleic acid | 1 | 1 | 1 | 1 |
| Isocetyl stearate | 6 | 10 | 4 | 12 |
| Isocyanate | 12 | 7 | 10 | 10 |
| Methyl ethyl ketone | 221 | 197 | 207 | 218 |
| Cyclohexanone | 74 | 66 | 69 | 73 |
| Toluene | 74 | 66 | 69 | 73 |

What is claimed is:

1. A magnetic recording medium comprising a nonmagnetic substrate, a liquid lubricant-containing coating layer formed on the substrate, and a magnetic layer formed directly on the coating layer, wherein the maximum amount of liquid lubricant which can be absorbed by a layer per unit volume of the layer is defined by U for the lubricant-containing coating layer and M for the magnetic layer, wherein the amount of liquid lubricant actually present within the lubricant-containing coating layer is in the range from 50% to 80% of U. $0.9 \leq M/U \leq 1.2$, and the magnetic layer has a thickness of 0.5 μm or less.

2. The medium of claim 1, wherein the lubricant-containing coating layer is a nonmagnetic layer comprising a nonmagnetic powder and a binder, the lubricant-containing coating layer having a weight ratio of the nonmagnetic powder to the binder from 85:15 to 65:35.

3. The medium of claim 2, wherein an amount of said liquid lubricant in the lubricant-containing coating layer is from 5 to 15 parts by weight per 100 parts by weight of the non-magnetic powder.

4. The medium of claim 3, wherein the magnetic layer has a thickness of 0.5 μm or less.

5. The medium of claim 2, wherein the magnetic layer has a thickness of 0.5 μm or less.

6. The medium of claim 1, wherein $0.9 \leq M/U \leq 1.2$.

7. The medium of claim 6, wherein the magnetic layer has a thickness of 0.5 μm or less.

8. The medium of claim 1, wherein the amount of liquid lubricant actually present within the lubricant-containing coating layer is in the range from 50% to 80% of U.

9. The medium of claim 8, wherein the magnetic layer has a thickness of 0.5 μm or less.

10. The medium of claim 1, wherein the magnetic layer has a thickness of 0.5 μm or less.

11. A magnetic recording medium comprising a nonmagnetic substrate, a liquid lubricant-containing coating layer formed on the substrate, and a magnetic layer formed directly on the coating layer, wherein the maximum amount of liquid lubricant which can be absorbed by a layer per unit volume of the layer is defined by U for the lubricant-containing coating layer and M for the magnetic layer, wherein $0.75 \leq M/U \leq 1.25$, and the amount of liquid lubricant actually Present within the lubricant-containing coating layer is in the range from 35% to 85% of U.

* * * * *

UNITED STATES PATENT AND TRADEMARK OFFICE
CERTIFICATE OF CORRECTION

PATENT NO.: 5,840,410

DATED: November 24, 1998

INVENTOR(S): Oiri et al.

It is certified that error appears in the above-identified patent and that said Letters Patent is hereby corrected as shown below:

In column 1, line 49, "support" should be --support,--.

In column 8, line 4, "FD-1331" should be --(FD-1331--.

In column 10, line 3, "Present" should be --present--.

Signed and Sealed this

Twenty-eighth Day of September, 1999

*Attest:*

Q. TODD DICKINSON

*Attesting Officer*         *Acting Commissioner of Patents and Trademarks*

UNITED STATES PATENT AND TRADEMARK OFFICE
CERTIFICATE OF CORRECTION

PATENT NO.  : 5,840,410
DATED       : November 24, 1998
INVENTOR(S) : Oiri et al.

It is certified that error appears in the above-indentified patent and that said Letters Patent is hereby corrected as shown below:

In column 8, line 34, claim 1 should be renumbered as claim 11.

In column 9, line 1, claim 11 should be renumbered as claim 1.

Signed and Sealed this

Twenty-sixth Day of October, 1999

Attest:

Q. TODD DICKINSON

*Attesting Officer*   *Acting Commissioner of Patents and Trademarks*